United States Patent [19]

Ragona

[11] Patent Number: 5,417,243
[45] Date of Patent: May 23, 1995

[54] PNEUMATIC INTERFACE APPARATUS FOR CALIBRATING HVAC SYSTEMS

[76] Inventor: Dominic Ragona, 738 S. Rte. 53, Lombard, Ill. 60148

[21] Appl. No.: 97,680

[22] Filed: Jul. 27, 1993

[51] Int. Cl.6 .......................................... F16K 11/085
[52] U.S. Cl. ........................... 137/625.19; 137/625.47; 251/14; 236/94
[58] Field of Search ....................... 137/625.18, 625.19, 137/625.47, 595; 251/14, 31, 62; 236/49.4, 94

[56] References Cited

U.S. PATENT DOCUMENTS

| | | | |
|---|---|---|---|
| 1,607,054 | 11/1926 | Chadborn | 236/49.4 |
| 3,282,651 | 11/1966 | Ferrari et al. | 137/625.19 X |
| 3,526,136 | 9/1970 | Caldwell, Sr. et al. | 137/625.47 X |
| 3,596,680 | 8/1971 | Adams | 137/625.47 X |
| 3,874,413 | 4/1975 | Valdez | 137/625.47 |
| 3,894,559 | 7/1975 | DePuy | 137/595 |
| 4,602,657 | 7/1986 | Anderson et al. | 137/595 |
| 4,716,923 | 1/1988 | West | 137/625.19 X |
| 4,949,936 | 8/1990 | Messina | 215/14 X |

Primary Examiner—John Rivell
Attorney, Agent, or Firm—Welsh & Katz, Ltd.

[57] ABSTRACT

A pneumatic switching apparatus is provided for a pneumatically controlled heating ventilating and air conditioning system of the type having an air supply line for supplying low pressure air to a pneumatic receiver-controller, a receiver controller which produces pneumatic output signals in dependence on pneumatic signals from pneumatic sensing devices and controlled valves which are actuated in dependence on the output signals. The apparatus includes an elongated manifold and a spool valve extending upward through the manifold. The manifold and spool valve are formed so that the receiver controller is connected to the air handling system when the spool valve is in an operating position. The manifold and spool valve are also formed so that the receiver controller is isolated from the air handling system and the air handling system is under manual control when the spool valve is in a calibration position.

The manifold and spool valve may also be formed to connect the receiver controller to the pneumatic sensing devices when the spool valve is in the operating position, and to connect the receiver controller to a calibration port in the manifold and isolate the receiver controller from the sensing devices when the spool valve is in the calibration position.

14 Claims, 3 Drawing Sheets

PNEUMATIC INTERFACE APPARATUS FOR CALIBRATING HVAC SYSTEMS

FIELD OF THE INVENTION

This invention generally relates to apparatus used in servicing pneumatically controlled HVAC systems and more particularly to devices for isolating an automatic pneumatic controller unit for the HVAC system while allowing manual control of the HVAC system.

BACKGROUND OF THE INVENTION

In many public buildings, the heating, ventilation and air conditioning (HVAC) requirements are handled by a HVAC system which is automatically controlled by a pneumatic control system. In addition to those buildings having HVAC systems which are primarily controlled by a pneumatic system, other buildings may have an HVAC system which is electronically controlled, but may also have a pneumatic system as a back-up.

In the typical pneumatically controlled HVAC system, pneumatic signals are formed by changing the pressure of the air within tubes which interconnect the various components. A variety of sensing devices, such as a pneumatic transmitter or thermostat, send pneumatic input signals along the interconnecting or connecting tubes to a receiver controller. In dependence on these pneumatic signals, the receiver controller outputs one or more pneumatic signals which are, in turn, relayed to controlled valves which control the components of the air-handling system. The components typically being dampeners, fans and chilled and hot water supply or return valves.

One of the drawbacks of the pneumatic control system is the difficulty in determining in which component the problem may be when the HVAC system is not functioning properly. For example, when the chilled water valve is not operating the problem may be in the pneumatic transmitter or thermostat, the receiver controller or the chilled water valve. To pneumatically isolate the individual components may require the locating and tapping of the pneumatic connecting tubes leading to and from the component. This locating and tapping is time consuming. Compounding this drawback is that to isolate the receiver controller to check the controller may require a complete shutdown of the HVAC system.

A related drawback is that when the pneumatic control system is not functioning properly, to switch to a manual control of the HVAC system may require the location of a maintenance person who then activates the manual control by bypassing the receiver controller, thus causing a delay before the HVAC system is properly functioning.

Another drawback of the pneumatically controlled HVAC system is the calibration of the receiver controller, which requires the application of known inputs to the receiver controller to determine whether the controller is operating properly. To isolate the receiver controller for calibration also may require a shutdown of the system. These shut-downs may be costly and uncomfortable for the occupants of the building.

An additional drawback in the calibration of the receiver controller is the wear and tear on the connecting tubes which lead to the receiver controller. During the calibration process, the connecting tubes must be disconnected and replaced by tubes from the calibration device. After the calibration, the connecting tubes must be reconnected. The connection and reconnection of the connecting tubes cause wear on the tubes which may cause the tubes to fail and be replaced.

It is therefore an object of the present invention to provide a device which isolates the receiver controller from the components of the HVAC system without requiring a shutdown of the system.

Another object of the present invention is to provide a device which isolates the receiver controller and allows manual control of the HVAC system. A related object of the present invention is to provide a device which allows for the receiver controller to be calibrated while the HVAC system is operating under manual control.

A further object of the present invention is to provide a device which allows the connection and disconnection of the calibration device to the receiver controller without requiring the disconnection and reconnection of the tubes normally connected to the receiver controller.

A further object of the present invention is to provide a device which automatically will actuate a manual control of the HVAC system when a problem with the pneumatic control system is detected.

SUMMARY OF THE INVENTION

Accordingly a pneumatic switching valve apparatus is provided for a pneumatically controlled heating ventilating and air conditioning system of the type having an air supply line for supplying low pressure air to a pneumatic receiver-controller, the receiver controller producing pneumatic output signals in dependence on pneumatic signals from pneumatic sensing devices and controlled valves which are actuated in dependence on the output signals. The apparatus includes an elongated manifold and a spool valve extending upward through the manifold. The manifold and spool valve form a first boring channel which fluidly connects the supply air to the receiver controller when the spool valve is in an operating position. The spool valve isolates the receiver controller from the supply line when the spool valve is in a calibration position.

The switching valve apparatus valve also forms at least one conduit which fluidly connects the receiver controller to the controlled valve when the spool valve is in the operating position and isolates the receiver controller from the controlled valve when the spool valve is in a calibration position.

The spool valve and manifold also form a second boring channel which when the spool valve is in the operating position, the spool valve isolates the supply line from the controlled valve. When the spool valve is in a calibration position, the second boring channel fluidly connects the supply line to the controlled valve. A portion of the second boring channel is formed to restrict the supply air from the supply line as the supply air flows through the second boring channel.

The apparatus also includes a valve fluidly connected to the second boring channel which controlledly varies the pressure of the supply air exiting the second boring channel so that a desired pressure of air may be obtained. The desired pressure is then transmitted to the HVAC system to allow manual control of the controlled valve.

The manifold and spool valve may also form a second conduit which connects the receiver controller to the pneumatic sensing devices when the spool valve is in the operating position, and connects the receiver controller to a calibration port in the manifold when the spool valve is in the calibration position while the spool valve isolates the receiver controller from the sensing devices.

DETAILED DESCRIPTION

Figure 1:
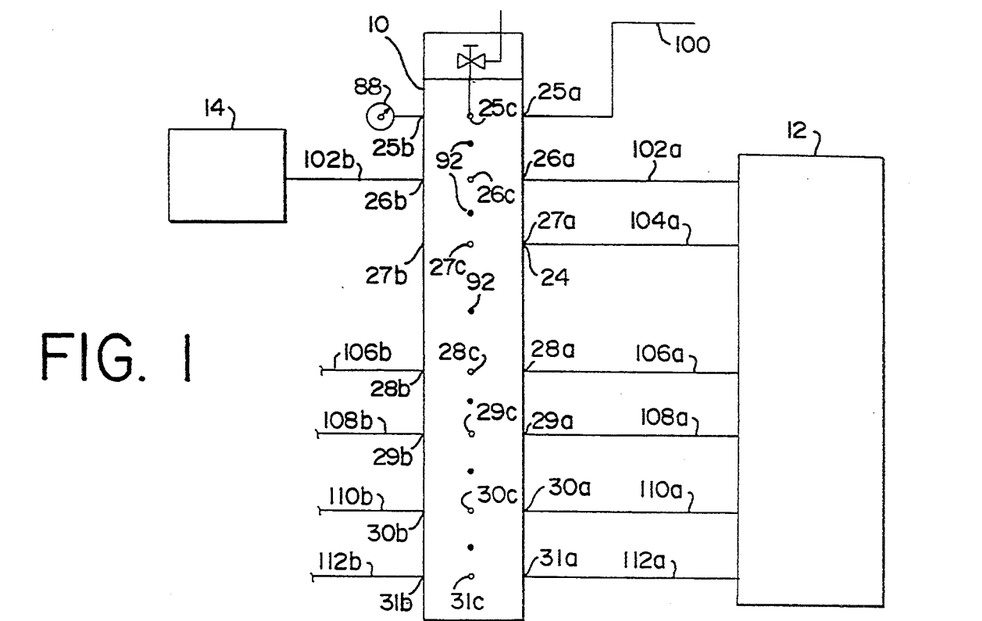
FIG.1 is a schematic view illustrating a pneumatic control system employing a pneumatic interface assembly of the invention.

Referring to FIG. 1, the present invention relates to a pneumatic switching valve apparatus or multi-stage switching valve, indicated generally at 10, for pneumatically isolating a pneumatic controller receiver 12 while allowing manual control of a pneumatically-controlled air-handling system 14.

Figure 2:
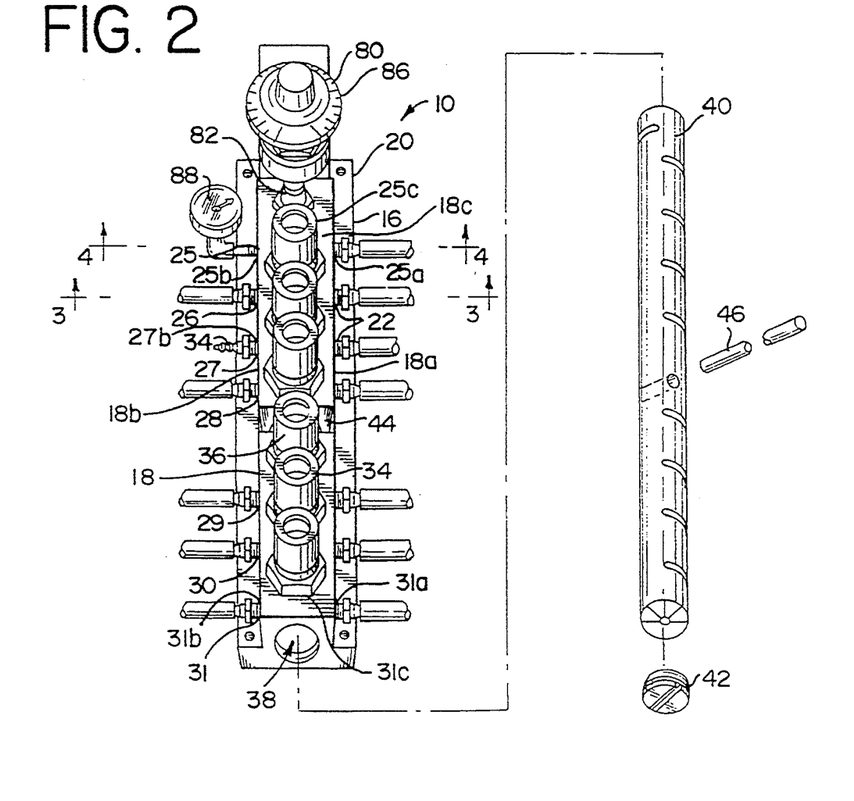
FIG. 2 is a diagrammatic exploded elevational view of the pneumatic interface assembly of the invention.

Referring to FIG. 2 in conjunction with FIG. 1, the device 10 includes a vertically elongated member 16 having a frontal rectangular block manifold portion 18 and a rearward mounting plate portion 20. The manifold 18 has a right planar face 18a, a left planar face 18b and a frontal or front planar face 18c.

The manifold 18 forms seven sets 22 of ports 24. The individual sets 22 of ports being numbered 25 through 31 with set 25 being located at the upper end of the manifold and set 31 being located at the lower end of the manifold. The ports 24 in each set 22 are horizontally aligned with each other. Each of the sets 26-31 includes an output port; for example 26a, in the right face 18a of the manifold 18; an input port, for example 26b, in the left face 18b of the manifold; and a calibration port, for example 26c, in the frontal face 18c of the manifold. Port set 25 includes an input port 25b in the left face 18b, an output port 25a in the right face 18a, and a PRY port 25c in the front face 18c. The output ports 25a through 31a and input ports 26b through 31b are threaded to receive hose couplings 34 such as hose barbs. However, the hose coupling 34 in input port 27b is sealed. Input port 25b is threaded. The PRY port 25c and calibration ports 26c-31c are threaded to receive the female component 36 of quick connect hose couplings for quick sealed attachment and detachment of pneumatic hoses (not shown) having mating male components of the quick connect hose coupling.

Extending vertically upward through the manifold 18 is a cylindrical bore 38. Within the bore 38 is a cylindrical spool valve 40. The upper and lower ends of the bore 38 are threaded to receive dime plugs 42 which contact the upper and lower ends of the spool valve 40. By selectively threading and unthreading the dime plugs 42, the spool valve 40 may be positioned within the bore 38. Ports 25c, 26a-31a, 26b-31b and 26c-31c extend from the faces of the manifold 18 inward to the bore 38, so that the ports are in fluid communication with the bore.

The surface of the manifold 18 forming the bore 38 and the spool valve 40 are micro machined such that the spool valve will rotate within the bore but air or other gases cannot flow along the interface between the manifold and spool valve. Thus, the spool valve 40 prevents air flow axially along the surface of the spool valve from one set 22 of ports 24 to an adjacent set of ports and between the ports 24 in each set 22.

Referring to FIG. 1 and 2, located on the front face 18c of the manifold 18 and vertically between port 27c and port 28c and extending from the front face to the bore 38 is a horizontally elongated channel 44. To rotate the spool valve 40 within the manifold 18, a toggle bat 46 is rigidly attached to the spool valve and extends outward through the channel 44. The connection between the spool valve 40 and bat 46 may be a threaded connection or the like so that the bat may be connected to the spool valve after it has been placed within the manifold 18. The movement of the toggle bat 46 from right to left causes a counter clockwise rotation, when viewed from below, of the spool valve 40.

The spool valve 40 is fabricated such that when the spool valve is in a calibration position as shown in FIG. 2, the calibration ports 26c through 31c are in fluid communication with the output ports 26a through 31a, respectively and the input ports 26b-31b are isolated.

Rotating the spool valve 40 by pivoting the toggle switch 46 from the right side to the left side of slot 44 places the spool valve in an operating position. In the operating position, the spool valve 40 provides fluid communication between the output ports 26a through 31a and the input ports 26b through 31b, respectively and isolates the calibration ports 26c through 31c. In the operating position, the toggle bat 46 extends out of the left side of the slot 44.

The channel 44 is configured so that when the toggle bat 46 contacts the manifold 18 at the left end of the channel, the spool valve 40 is rotationally set in the operating position. When the toggle bat 46 contacts the manifold 18 at the right end of the channel 44, the spool valve 40 is rotationally set in the calibration position. In the preferred embodiment, the spool valve 40 is rotated 45° when rotated from the operating position to the calibration position and vice versa.

Figure 3:
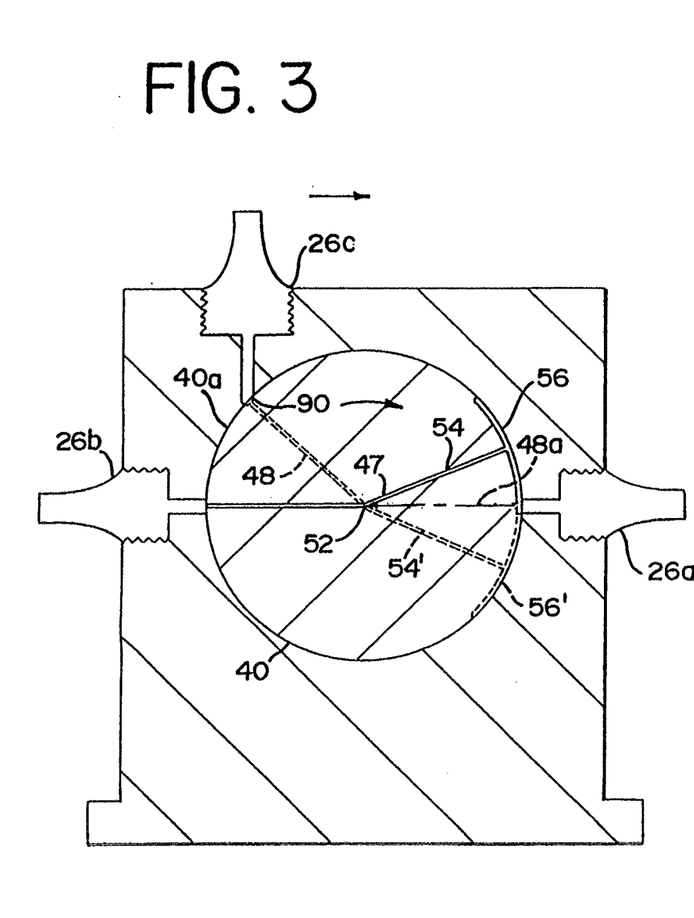
FIG. 3 is a sectional view taken along line 3—3 of FIG. 2 and in the direction indicated generally.

Referring to FIG. 3, for port set 26, the spool valve 40 has a first conduit 47 which includes a horizontally extending first bore 48 which extends radially inward from the outer surface 40a of the spool valve 40 to a vertical axis 52 of the valve. The first conduit 47 also includes horizontally extending second bore 54 which extends radially inward from the outer circumferential surface 40a of the valve to the axis 52 where the second bore connects to the first bore 48. The second bore 54 is angularly offset by 22.5 degrees from an imaginary extension 48a of the first bore 48 through the valve. Extending about a portion of the circumference of the spool 40 in the same horizontal plane as the first bore 48 and second bore 54 is a connecting slot 56. Preferably the slot 56 extends about a 45 degree arc with the second bore 54 bisecting the slot.

The output port 26a, and input port 26b are horizontally aligned. The spool valve 40 and calibration port 26c are positioned in the manifold 22 so that when the spool valve 40 is in the operating position as shown in solid, the first bore 48 is fluidly connected to the input port 26b; the slot 56 is fluidly connected to the output port 26a; and the first bore 48, second bore 54 and slot 56 of the first conduit 47 provide fluid communication between the output port 26a and input port 26b. Also, the calibration port 26c is isolated by the spool valve 40.

The input port 26b, output port 26a calibration port 26c and spool valve 40 are also positioned so that when the spool valve 40 is rotated clockwise, when viewed from below, to the calibration position, as shown in shadow in FIG. 3, by movement of the toggle bat 46 (FIG. 2) from left to right, the first bore 48 is fluidly connected to the calibration port 26c the slot 56 is fluidly connected to the output port 26a; and the first bore 48, second bore 54 and slot 56 of the first conduit 47 provide fluid communication between the calibration port 26c and the output port 26a. Also, the spool valve 40 isolates the input port 26b.

It is therefore apparent that slot 56 provides fluid communication between the first bore 48 and the output port 26a regardless of whether the spool valve 40 is in the calibration position or the operating position.

Referring to FIGS. 1 and 3, each of the ports in the port sets 27-31 is vertically aligned with port set 26. In addition, the portion of the spool valve 40 horizontally corresponding to each of the port sets 27-31 includes a first conduit 47 having a first bore 48, a second bore 54 and a slot 56 similar to and vertically aligned with the first bore, second bore and slot of the first conduit 47 for port set 26 so that when the spool valve 40 is in the operating position, the first conduit 47 for each port set 27-31 provides fluid communication between the output ports 27a-31a and the input ports 27b-31b, respectively, and the calibration ports 27c-31c, respectively, are isolated. When the spool valve 40 is in the calibration position, the first conduit 47 for port set 27-31 provides fluid communication between the output ports 27a through 31a and the calibration ports 27c through 31c, respectively, and the input ports 27b through 31b are isolated.

Figure 4:
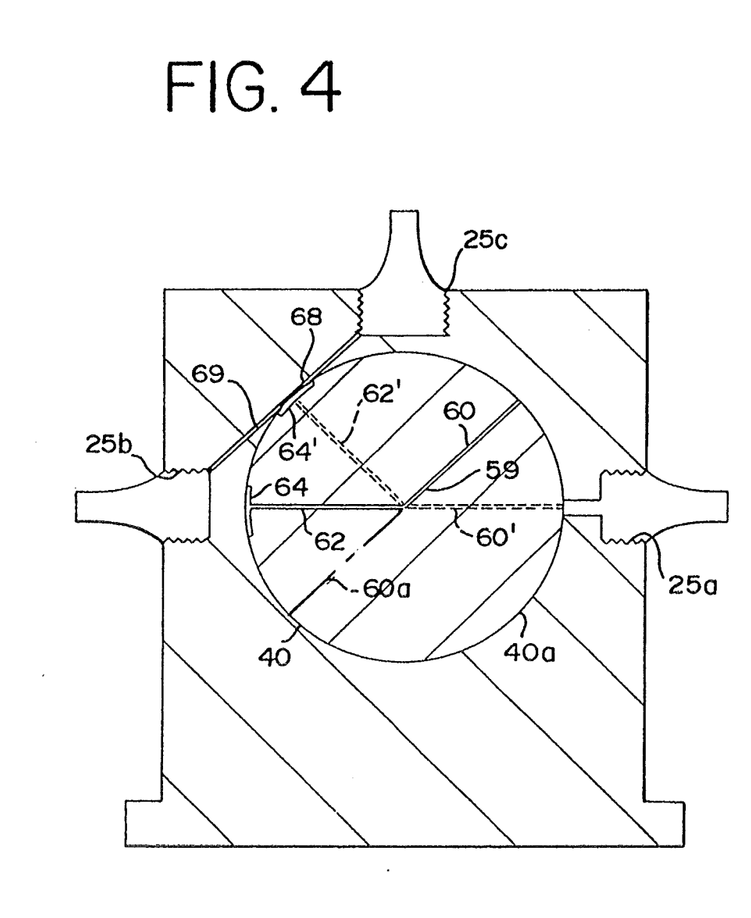
FIG. 4 is a sectional view taken along line 4—4 of FIG. 2 and in the direction indicated generally.

Referring to FIG. 4, for port set 25, the spool valve 40 has a second boring channel 59 with a horizontally extending third bore 60 which extends radially inward from the outer surface 40a of the spool valve to the vertical axis 52 of the valve. The third bore 60 is of a small diameter, preferably 0.007", to restrict the flow of fluid such as gas through the port. The third bore 60 is in the same horizontal plane as ports 25a and 25b. The second boring conduit 59 also has a horizontally extending fourth bore 62 which extends radially inward from a slot 64 of the second boring channel to the vertical axis 52. At the vertical axis 52, the fourth bore connects with the third bore 60 so that the third bore and fourth bore are in fluid communication. The fourth bore 62 is angularly offset by 45° from an imaginary extension 60a of the third bore 60 through the valve. The slot 64 extends about a portion of the circumference of the spool valve 40 in the horizontal plane.

The third bore 60, fourth bore 62 and slot 64 of the second boring channel 59 are located so that when the spool valve 40 is in the calibrating position, as shown in shadow, the third bore 60, fourth bore 62 and slot 64 are in communication with the output port 25a. Also, the slot 64 forms a portion 68 of a conduit 69 of the second boring channel 59 which extends from input port 25b horizontally through the manifold 20 and valve 40 to PRV port 25c. The conduit 69 thereby provides fluid communication between the output port 25b and the port 25c. Thus, the second boring channel 59 provides fluid communication between the output port 25a, input port 25b and PRV port 25c when the spool valve is in the calibrating position.

When the spool valve 40 is in the operating position, the slot 64 has been rotated counter clockwise, when viewed from below, so that the conduit 69 is blocked between the input port 25b and the regulation port 25c; and therefore, the spool valve isolates the input port 25b from the PRV port 25c. Also, when the spool valve 40 is in the operating position, the third bore 60 is no longer in fluid communication with the output port 25a, and thus, the output port is isolated. Therefore in the operating position the second boring channel 59 isolates the regulation port 25c, input port 25b and output port 25a from each other.

Figures 5, 6:
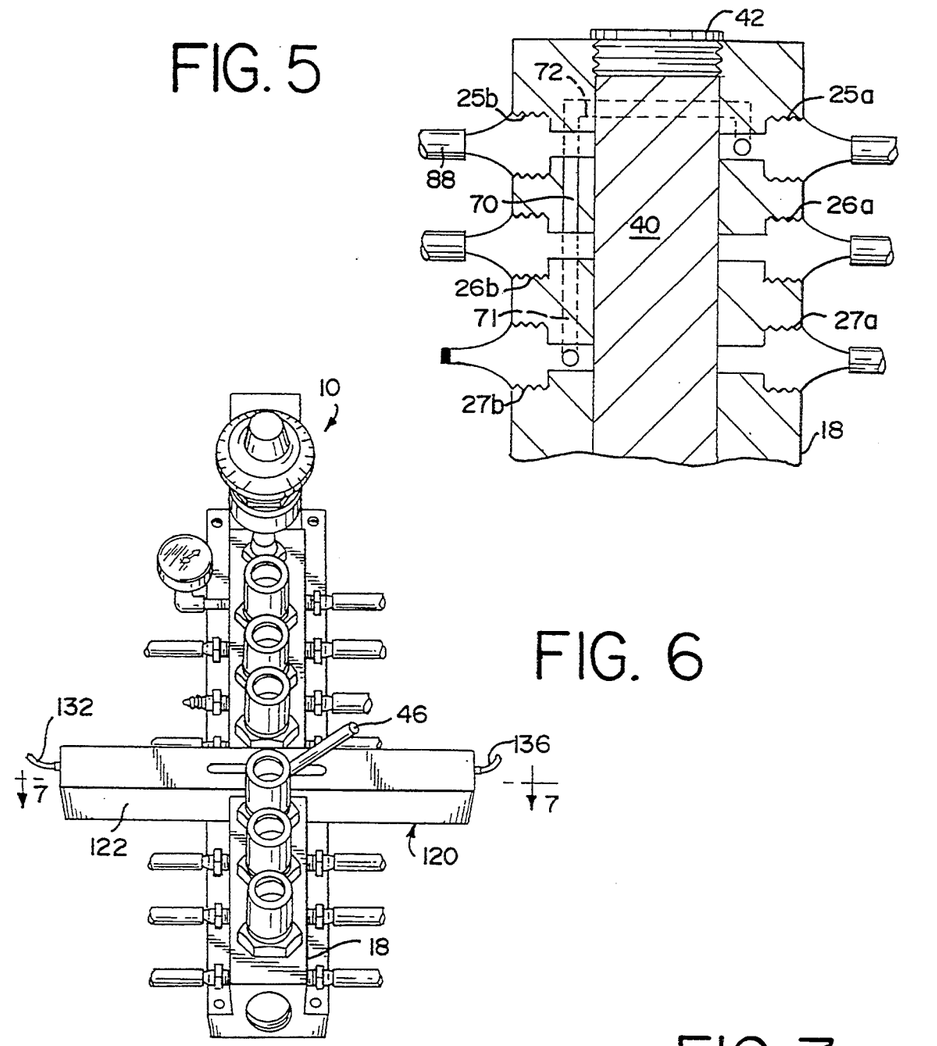
FIG. 5 is a partial sectional view of the upper end of the pneumatic interface assembly of FIG. 1.
FIG. 6 is a diagrammatic sketch of an actuating mechanism shown mounted on the assembly of FIG. 2.

Referring to FIG. 5, port 25b is in fluid communication with port 26b by a fifth bore 70 of the second boring channel 59 which vertically extends through the manifold 22 from input port 25b and connects to input port 26b. Thus, input port 25b is in fluid communication with input port 26b regardless of the position of the spool valve 40.

A first boring channel 71 has a sixth bore 72 which extends vertically and horizontally through the manifold 18 from output port 25a to input port 27b. Therefore, output port 25a is in fluid communication with input port 27b, regardless of the position of the spool valve 40. The first boring channel 71 also includes the first conduit 47 (FIG. 3) of port set 27.

Referring to FIG. 2, the multi-valve device 10 also includes a manually variable controlled pressure regulating valve 80 which is mounted on the mounting plate 22 vertically above the manifold 18. A flexible tube 82 is connected to a hose connector 84 in regulation port 25c and provides fluid communication between PRV port 25c and the inlet to the pressure regulating valve 80.

Threadably received in the input port 25b is a pressure gauge 88 for displaying the pressure present at the input port 25b. The gauge 88 can have a dial or other suitable display device to display the pressure.

Referring to FIG. 3, for each of the port sets 26-31, the spool valve 40 forms a vertically extending slot 90, which extends from a point horizontally aligned with the calibration ports 26c-31c respectively, to exhaust opening slots 92 (FIG. 1) above the calibration ports when the spool valve is in the operating position. The vertical slot 90 and exhaust slot 92 release any pressurized air present at the calibration ports 26c-31c when the spool valve 40 is moved into the operating position.

Referring to FIG. 1, an air supply line 100 is pneumatically connected to output port 25a to supply pressurized air of between 0 psi and 20 psi. An output line 102a pneumatically connects output port 26a to the receiver controller 12. A second output line 102b pneumatically connects input port 26b to the air handling system 14. An input supply line 104a pneumatically connects output port 27a to the pneumatic controller 12. A fan output line 106a pneumatically connects output port 28a to the receiver controller 12, and a second fan line 106b pneumatically connects input port 28b to a pneumatically controlled fan (not shown). Lines 108a, 110a and 112a pneumatically connect output ports 29a, 30a, 31a, respectively, to the receiver controller 12. Second instrument lines 108b, 110b and 112b pneumatically connect input ports 29b, 30b and 31b, respectively, with pneumatic sensing devices (not shown) in the air handling system 14.

Referring to FIGS. 1, 3, and 4, in operation, when the air handling system 14 is operatively controlled by the receiver controller 12, switching valve 10 is in the operating position. Supply line 100 provides pressurized supply air to port 25a. The supply air from port 25a is then transmitted through sixth bore 72 to port 27b. From port 27b, the supply air is transmitted to port 27a through first bore 48, second bore 54 and slot 56 of port set 27. From output port 27a, the supply air is transmitted to the receiver controller 12 through conduit 104a. Therefore, in the operating position the first boring channel 71 provides fluid communication between the supply line 100 and the receiver controller 12.

As is known in the art, in dependence on pneumatic signals received from the pneumatic sensing devices (not shown), the receiver controller 12 uses the pressurized supply air to fashion pneumatic output signals to the air handling system 14. The output signal from the receiver controller 12 is transmitted through conduit 102a to output port 26a. The output signal travels from output port 26a through slot 56, second bore 54 and first bore 48 of port set 26 to input port 26b. The output signal from input port 26b is transmitted via conduit 102b to the air handling system 14. Therefore, the first conduit 47 of the port set 26 provides fluid communication between the receiver-controller 12 and the air handling system when the valve 10 is in the operating position.

Pressure gauge 88 disposed in input port 25b registers the pressure of the output signal flowing through port 26b due to the connection of input port 26b to input port 25b by fifth bore 70 and due to the isolation of input port 25b from calibration port 25c and output port 25a.

A fan control pneumatic signal is also produced by the receiver controller. The fan control signal is transmitted from receiver controller 12 via conduit 106a to port 28a. From port 28a, the fan control signal is transmitted via slot 56, second bore 54 and first bore 48 of the first conduit 47 of port set 28 to input port ash. From input port 28b, the fan control signal is transmitted via conduit 106b to the fan control (not shown).

Pneumatic inputs from pneumatic sensing devices (not shown) are transmitted via conduits 108b, 110b, 112b to ports 29b, 30b and 31b, respectively. The input signals are transmitted from input ports 29b, 30b and 31b to output ports 29a, 30a, 31a respectively, by the first bore 48, second bores 54 and slots 56 of the first conduits 47 for each port set 29, 30 and 31, respectively. From output ports 29a, 30a and 31a, the input signals are transmitted to the receiver controller 12 by conduits 108a, 110a and 112a, respectively. In dependence on these input signals, the receiver controller 12 adjusts the output signal and fan control signal.

Thus, it can be seen that in the operating position, the switching valve 10 functions as a connector for the supply air, output and fan control signals, and input signals. In effect, the valve 10 is invisible to the pneumatic control system. The device 10 does provide an indication of the output signal through pressure gauge 88; however, the gauge 88 does not affect the operation of the pneumatic control system.

Referring to FIGS. 1 and 2, when it is necessary to isolate the receiver controller 12 and provide manual control to the air handling system 14, the toggle bat 46 is moved from the left to the right, until the bat contacts the right end of the channel 44, thereby rotating the spool valve 40 in a clockwise rotation, when viewed from below. This rotation places the spool valve 40 in the calibrating position. In the calibrating position, ports 29b, 30b and 31b are isolated from ports 29a, 30a and 31a, respectively. Therefore, no pneumatic signal inputs from the pneumatic sensing devices (not shown) are transmitted to the receiver controller 12.

Also, when the switching valve 10 is in the calibrating position, input port 28b is isolated from output port 28a so that the fan control signal generated by the receiver controller 12 is blocked from reaching the fan controlled device (not shown).

Referring to FIGS. 1 and 4, as previously described, in the calibration position, the slot 64 forms a portion 68 of the conduit 69 of the second boring channel 59 so that input port 25b and PRV port 25c are fluidly connected and in communication. In addition, third bore 60 and fourth bore 62 of the second boring channel 59 fluidly connect input port 25a with the conduit 69. Therefore, the supply air entering input port 25a flows through third bore 60 where the flow of the air is restricted. The supply air then travels through fourth bore 62 to conduit 69 which connects regulation port 25c to input port 25b.

Regulation port 25c is fluidly connected by tube 82 to the pressure regulating valve 80. The regulating valve 80 operates such that the valve emits air if the pressure of the air at the input of the valve is above the set point. Thus, because the regulating valve 80 is connected to the conduit 69, a variable and controllable portion of the supply air which flows through the restricted third bore 60 can be bled off if the pressure of the air exiting the third bore and entering the conduit 69 is above the set point of the regulating valve 80.

Referring to FIGS. 1, 2 and 4, the pressure of the air in conduit 69 is transmitted to input port 25b where the pressure is registered by the gauge 86 disposed in input port 25b. Because the input port 25b is fluidly connected to input port 26b by fifth bore 70 of the second boring channel 59, the pressure of the air within the conduit 69 is also transmitted to input port 26b and then further transmitted to the air handling system 14 via conduit 102b. The pressure of the air in conduit 69 thus acts as a pneumatic signal to the air handling system 14. Also, the air handling system 14 is no longer receiving signals from the receiver controller 12 because when the spool valve 40 is in the calibrating position, input port 26b is isolated from output port 26a by the spool valve 40 and therefore, the system 14 is isolated from any pneumatic output signal from the controller.

To manually control the pressure of the supply air in conduit 69 which is transmitted to the air handling system 14 thereby controlling the air handling system, the user adjusts the set point on the regulating valve 80 with the manual dial 82 while monitoring the pressure registered by gauge 88 until the pressure indicated on the gauge is the desired pressure to operate the air handling system 14. The user may also manipulate the relief valve 80 to send various pneumatic signals to the air handling system 14 to test the system.

If the pressure of the supply air entering the conduit 69 from the restricted third bore 60 is greater than the desired pressure, the pressure relief valve 80 will increase the flow of the air bled off by the relief valve. Also, once set, the pressure relief valve 80 will maintain the desired pressure of air transmitted to the air handling system 14 until the relief valve is adjusted or the spool valve 40 is placed in the operating position.

When the spool valve 40 is in the calibrating position, output port 25a is fluidly connected to input port 27b by sixth bore 72 of the first boring channel 71; however, input port 27b is isolated from output port 27a by the spool valve 40, and, therefore, none of the supply air entering the output port 25a reaches the controller 12 through conduit 102a.

Also, when the spool valve 40 is in the calibrating position, the receiver controller 12 may be calibrated. To calibrate the receiver controller 12, the user selectively connects a calibrating device (not shown) to hose couplings 34 and, thus, to calibration ports 26c–31c which are in fluid communication with output ports 26a–31a, respectively, and therefore, the receiver controller. By applying known pneumatic inputs to the receiver controller 12 and monitoring the pneumatic outputs from the receiver controller, the receiver controller may be calibrated without the disconnection of the conduits 102a–112a from the receiver controller thereby reducing wear and tear on the conduits.

In an alternate arrangement (not shown) of the switching valve 10, the supply tube 100 is connected to input port 27b and output port 25a is plugged. Because input ports and output port 25a are fluidly connected by sixth bore regardless of the position of spool valve 40, the above-described operation of the switching valve 10 is essentially the same; however, the user has the flexibility to connect the supply line 100 to either side of the switching valve 10.

Figure 7:
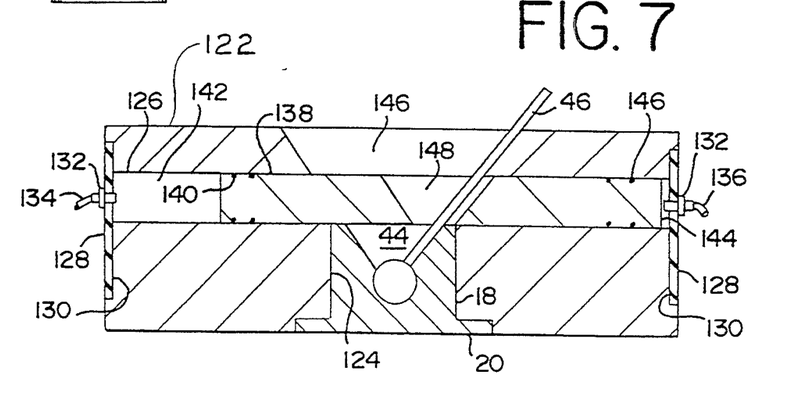
FIG. 7 is a sectional view taken along line 7—7 of FIG. 6 and in the direction generally indicated.

Referring to FIGS. 6 and 7, to automatically shift the toggle bat 46 and therefore the spool valve from the operating position or normally open position to the calibrating position or normally closed position, or from the normally closed position back to the normally open position, the switching valve 10 includes a pneumatic actuating device 120. The actuating device 120 includes an elongated rectangular block cylinder 122 which is oriented horizontal or normal to the elongation of the manifold 18. The cylinder 122 forms a central recess 124 which is sized to matingly fit about the manifold 18 and mounting plate 20.

A cylindrical bore 126 horizontally extends through the cylinder 122. The ends of the bore 126 are sealed by face plates 128 which are mounted in seats 130. Extending through each of the face plates 128 and in fluid communication with the bore 126 are hose connectors 132. Attached to hose connectors 132 are left hose 134 and right hose 136 which are both connected to a four way solenoid (not shown).

Slidably located within the bore 126 is spool 138. Spool 138 includes a set of O-ring seals 140 on each end of the spool to provide a generally gas tight dynamic seal between the spool and the cylinder 122. The length of the spool 138 is less than the length of the cylinder 122 so that left and right chambers 142 and 144 are formed.

The cylinder 122 and spool 138 include aligned frustotriangular shaped slots 146 and 148, respectively, which operating outward. The cylinder 122 is boltedly attached to the mounting plate 20 and the slots 146 and 148 are sized and aligned with the channel 44 so that the toggle bat 46 extends outward through the slots 146 and 148.

In operation, to automatically operate the actuating device 120 to rotate the spool valve 40 from the normally open position to the normally closed position, pressurized air from the four way solenoid (not shown) is transmitted through a left hose 134 and into left chamber 142 to pressurize the chamber. The pressurized air in left chamber 142 exerts a rightward force against the spool 138 and moves the spool to the right. As the spool 138 moves to the right, the spool contacts the bat 46 and pushes the bat to the right which rotates the spool valve 40 into the normally closed.

To automatically operate the actuating device 120 to rotate the spool valve 40 from the normally closed position to the normally open position, pressurized air from the four way solenoid is transmitted through right hose 136 and into right chamber 144 to pressurize the chamber. The pressurized air in right chamber 144 exerts a leftward force against the spool 138 and moves the spool to the left. As the spool moves to the left, the spool contacts the bat 46 and pushes the bat to the left which rotates the spool valve 40 into the normally open.

When the spool valve 40 is rotated back into the normally open position, pressurized air at calibration ports 26c–31c is bled off by exiting to the atmosphere through slot 90 and exhaust port 92.

A specific embodiment of the novel pneumatic interface apparatus for calibrating an HVAC system according to the present invention has been described for the purposes of illustrating the manner in which the invention may be made and used. It should be understood that implementation of other variations and modifications of the invention in its various aspects will be apparent to those skilled in the art, and that the invention is not limited by the specific embodiment described. It is therefore contemplated to cover by the present invention any and all modifications, variations, or equivalents that fall within the true spirit and scope of the basic underlying principles disclosed and claimed herein.

What is claimed is:

1. A pneumatic switching apparatus for a pneumatically controlled heating ventilating and air conditioning system of the type having an air supply line for supplying low pressure air to a pneumatic receiver-controller, the receiver controller providing pneumatic output signals in dependence on pneumatic input signals from pneumatic sensing devices and controlled valves which are actuated in dependence on the pneumatic output signals, said apparatus comprising:

an elongated manifold;
a spool valve means extending upward through said manifold, said manifold and said spool valve including,
first boring channel means for connecting the supply air to the receiver controller when said spool valve is in a first position, said spool valve means isolating the receiver controller from the supply line when the spool valve is in a second position,
first conduit means for connecting the receiver controller to the controlled valve when said spool valve is in said first position, said spool valve means isolating the receiver controller from the controlled valve when the spool valve is in said second position,
second boring channel means for fluidly connecting the supply line to the controlled valve when said spool valve is in said second position, said second boring channel means including means for causing a restriction in a flow of fluid flowing through a portion of said second boring channel means; and
valve means in fluid communication with said second boring channel means for varying the pressure of the supply air exiting from said second boring channel to the controlled valve.

2. The apparatus of claim 1 wherein said restriction means includes a restricted bore.

3. The apparatus of claim 1 wherein said valve means includes means for varying the flow of supply air through said portion of said second boring channel means in dependence on the pressure of fluid exiting said portion.

4. The apparatus of claim 3 wherein said flow varying means includes an adjustable pressure regulating valve.

5. The apparatus of claim 1 further including an actuating means operably connected to said spool valve for rotating and positioning said spool valve in one of said first position and said second position.

6. The apparatus of claim 1 further including gauge means in fluid communication with said second boring channel means for registering the pressure of the fluid exiting said second boring channel means.

7. The apparatus of claim 2 wherein said restricting bore has a diameter of approximately 0.007 inches.

8. The apparatus of claim 1 wherein said manifold forms at least one calibration port and said manifold and said spool valve includes a second conduit means for fluidly connecting the receiver controller to at least one of the pneumatic sensing devices when said spool valve is in a first position, and fluidly connecting said at least one calibration port to the receiver controller when said spool valve is in said second position.

9. A pneumatic switching apparatus for a pneumatically controlled heating ventilating and air conditioning system, said apparatus comprising:
an elongated manifold having a first set of laterally aligned ports, said first set including a PRV port, a first output port and a first input port, said manifold also including a second set and a third set of laterally aligned ports, each of said second set and said third set having a calibration port, a second output port, and a second input port, said manifold forming a first bore for providing fluid communication between said first output port and said second input port of said third set;
a spool valve means extending longitudinally within said manifold, said valve means forming a plurality of conduit means, one of said conduit means corresponding to each of said second set and said third set, said conduit means providing fluid communication between said second input port and said second output port for said corresponding set when said valve means is in a first position and for providing fluid communication between said second input port and said calibration port for said corresponding set when said valve means is in a second position,
said valve means and said manifold forming a second bore means for providing fluid communication between said PRV port, said first input port, and said first output port of said first set when said valve means is in said second position, said manifold forming a third bore means for providing fluid communication between said second bore means and said second output port of said second set;
means fluidly connected to said PRV port of said first set for varying the pressure of fluid exiting said second bore means when said valve means is in said second position; and
actuating means operably connected to said valve means for moving said valve means from said first position to said second position.

10. The switching apparatus of claim 9 wherein said second bore means includes means for restricting the flow of air through a portion of said second bore means.

11. The switching apparatus of claim 9 wherein a pressure indicating device is fluidly connected to said first input port.

12. The switching apparatus of claim 9 wherein said pressure varying means is an adjustable pressure relief valve.

13. A pneumatic switching apparatus comprising:
an elongated manifold having a first set of laterally aligned ports, said first set having a calibration port, an output port, and an input port, said manifold also forming an exhaust slot;
a spool valve means extending longitudinally within said manifold, said valve means forming a conduit means for providing fluid communication between said input port and said output port when said valve means is in a first position and for providing fluid communication between said input port and said calibration port when said valve means is in a second position, said valve means also forming a slot means for providing a fluid connection between said calibration slot and said exhaust port when said valve means is in said first position; and
actuating means operably connected to said valve means for moving said valve means from said first position to said second position.

14. The switching apparatus of claim 13 wherein said actuating means includes a pneumatic actuating device.

* * * * *

UNITED STATES PATENT AND TRADEMARK OFFICE
CERTIFICATE OF CORRECTION

PATENT NO. : 5,417,243

DATED : May 23, 1995

INVENTOR(S) : Dominic Ragona

It is certified that error appears in the above-indentified patent and that said Letters Patent is hereby corrected as shown below:

In Column 3, lines 50 and 54, and in Column 6, line 1, "PRY" should read -- PRV--.

In Column 4, line 33, Column 5, lines 3 and 19, and Column 6, line 52, insert a space after "26a" at each occurrence.

Column 5, line 5, insert a comma after "26a".

Column 5, line 11, insert a semicolon after "26c".

Column 6, line 6, delete the space at the end of the line so that the semicolon (shown on the next line) immediately follows "25c" in line 6.

Column 7, line 37, delete "ash" and in place thereof insert --28b--.

Column 9, line 20, insert --27b-- after "ports".

Column 9, line 21, insert --72,-- after "bore".

Signed and Sealed this

Thirtieth Day of April, 1996

Attest:

BRUCE LEHMAN

Attesting Officer

Commissioner of Patents and Trademarks